Jan. 3, 1928.

R. B. DALE ET AL 1,655,259

DOG RACING APPARATUS

Filed April 15, 1927

Inventors
Robert Burdette Dale
Augustus M. Henry
by Attorneys, Edwards & Henry

Patented Jan. 3, 1928.

1,655,259

UNITED STATES PATENT OFFICE.

ROBERT BURDETTE DALE AND AUGUSTUS M. HENRY, OF NEW YORK, N. Y., ASSIGNORS TO MILTON J. GORDON, OF NEW YORK, N. Y.

DOG-RACING APPARATUS.

Application filed April 15, 1927. Serial No. 183,980.

This invention relates to dog-racing stadia such as have lately come to be rather widely used for amusement enclosures wherein greyhounds or other dogs race around a predetermined path, hereinafter called the running path or course, in a speed contest stimulated by an artificial rabbit or other lure carried around the course ahead of the dogs.

In a racing contest of this kind, the lure is commonly mounted on one end of a support the other end of which is connected to a carrier means adapted to sweep the support and lure along the course at a high rate of speed.

Sometimes the support is extended horizontally over the course, the carrier then usually running on tracks in a trench alongside the course. Sometimes, the support extends upwardly through a slot along the course, the carrier being in a tunnel or chamber below the course. Of course, other arrangements of support and lure may be devised; but probably in all cases there will be some combination of a transporting means for a movable lure and a suitable support for the lure adapted during the running of the race to support the lure in sight of the dogs and always a distance ahead of them such that the lure is never so far ahead of the dogs as to discourage them or so close to the dogs as to bring about any likelihood that they may by a sudden spurt forward actually reach the lure.

The dogs are exceedingly intelligent, and it is most important that they be kept as long as possible, and preferably for the entire racing life of each dog, under the delusion that the lure is actually a live animal, such as a rabbit.

One of the objects of the present invention is to provide a lure which during the running of a race may be caused apparently to emit a characteristic vociferation of the animal simulated during actual cross-country chase. Such a vociferation will hereinafter be referred to as a squeal, since the call of terror emitted by a rabbit as the cross-country chase nears the "kill" may be sometime aptly thus described.

Another object is to provide a lure and carrier associated with means for emitting a squeal or a series of squeals apparently from the lure at the will of the attendant supervising the race and the speed of travel of the lure.

Another object is to provide a lure and carrier associated with the means last referred to, and wherein the operation of said means is controlled or affected by the speed of movement of the carrier, so that the squeal means may be actuated by temporarily subjecting the carrier to one of a series of sudden short spurts along the path of travel of the carrier.

Various other objects and advantages of the invention than those hereinabove mentioned will be specifically pointed out or will be apparent hereinafter, in the course of the below detailed description of the forms of the invention shown in the accompanying drawing, as preferred ones of the various possible embodiments of the invention; it being understood, naturally, that such forms are merely illustrative of several of the many possible combinations and arrangements of parts whereby the objects of the invention may be attained, and hence said detailed description of such forms is not to be taken as at all defining or limiting the invention itself. That is to say, the scope of protection contemplated is of course to be taken from the appended claims, interpreted as broadly as is consistent with the prior art.

Figure 1:
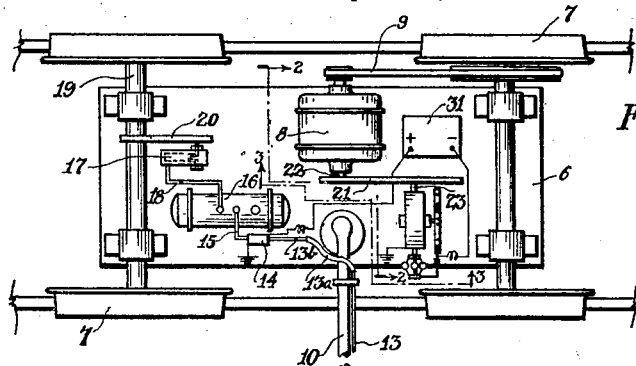
Fig. 1 is a top plan view illustrating a lure and carrier equipped with one form of the invention.
Figure 2:
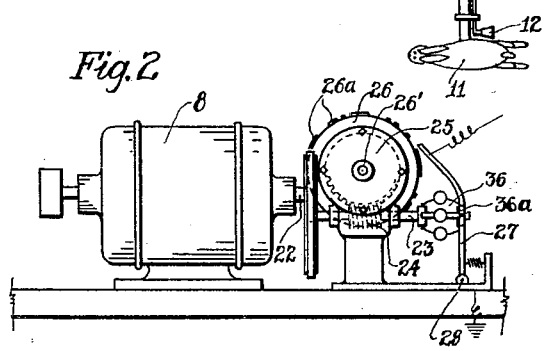
Fig. 2 is an enlarged vertical section taken on line 2—2 of Fig. 1 and showing certain details of construction.
Figure 3:
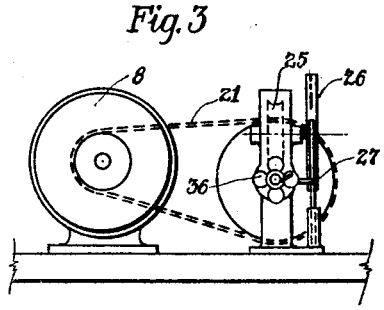
Fig. 3 is a view similar to Fig. 2 but taken on line 3—3 of Fig. 1.
Figure 4:
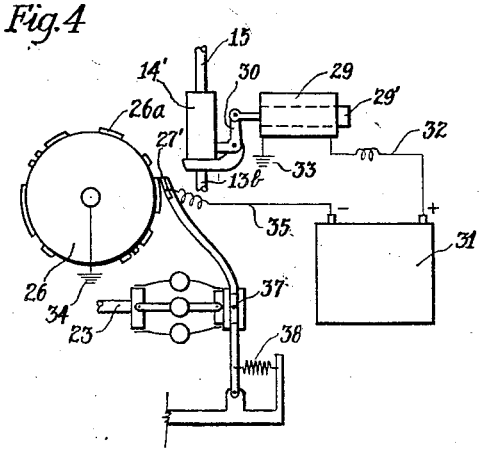
Figure 5:
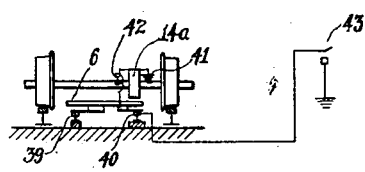

Fig. 4 is a schematic view, illustrating certain of the details of Figs. 1, 2 and 3, but showing more clearly certain operations of and connections forming parts of electrical means incorporated in this form; and Fig. 5 is a view showing in end elevation a truck similar to that shown in plan in Fig. 1, and also showing more or less diagrammatically certain electrical connections, this view illustrating another form of the invention.

Similar reference characters refer to similar parts throughout the several views of the drawing.

Referring first to Fig. 1, the present invention is shown as applied, for example, to that form of carrier now largely favored, and comprising a small four-wheeled electric truck travelling on a railway track extended alongside the racing course and carrying a driving motor energized through a third rail, and on which truck the lure support is laterally offset to have its outboard end support the lure for travel along the course. As shown, the truck body or chassis 6, supported by the track wheels 7, these wheels driven from a motor 8 on the body through a sprocket chain drive 9, carries an arm-like support 10 for the lure 11 here constituted as a stuffed or distended rabbit skin.

Still referring to Fig. 1, on the support 10 near the lure 11 is a rearwardly directed squeal emitting instrumentality 12 adapted in the present case to be actuated by air pressure transmitted through tube or tubing elements 13, 13ª and 13ᵇ leading back to a normally closed valve within a casing 14 containing valve means of the well-known solenoid actuated type. Beyond the valve casing a conduit 15 leads to a storage tank 16 for air under pressure. The air in tank 15 is maintained under the required pressure by an air pump 17 of any suitable type, discharging into a conduit 18 leading to tank 16, and continuously actuated by the forward travel of the truck, through front axle 19, and a chain drive indicated at 20 running from said axle to the working part of the pump.

Referring now to Figs. 2, 3 and 4, as well as to Fig. 1, a chain drive, indicated at 21, from the motor shaft 22 to a worm shaft 23, continually rotates a worm 24 fixed on said shaft. This worm meshes with a worm gear 25 thereabove fixed on a shaft 26′ having secured thereon a current make and break disc 26, the irregular and irregularly spaced projections 26ª on which are adapted to make contact with a leaf 27 pivoted at 28 during such times as the leaf is swung in at its upper end toward these projections sufficiently to have the latter pass into and out of contact with the leaf during rotation of the disc. As certain of the parts are shown in Fig. 4, there is indicated at 29 a solenoid; this solenoid in this view being located (for purposes of clarity) in a separate casing than the valve casing 14′ of Fig. 4, which casing 14′ corresponds to the casing 14 of Fig. 1. It will therefore be understood that when the solenoid 29 is actuated to throw its armature 29′ to the right, such armature movement actuates bell-crank 30 to open the valve within casing 17′, which valve normally keeps conduits 15 and 13ᵇ, corresponding to the similarly numbered conduits of Fig. 1, out of communication. The solenoid is thus actuated whenever contact is made between a projection 26ª on disc 26, and pivoted leaf 27, through the circuit thus established including the positive terminal of a battery 31, wire 32, the winding of the solenoid, the ground 33, the ground 34, the disc 26, the wiper end 27′ of leaf 27, and wire 35.

Thus, assuming such wiper end of the leaf 27 to be continually held against the interrupted periphery of disc 26 constituted by the projections 26ª and the intervening spaces, the instrumentality 12 would emit without cessation during travel of the truck an irregular series of irregularly intermittent squeals.

However, in order to cause the emission of a squeal or a series of such squeals only at certain times during a race, as when the dogs are at top speed and apparently gaining on the lure near the end of a race, the following parts are provided.

A centrifugal governor 36 is mounted on worm shaft 23, and the sleeve 36ª of this governor carries a groove as shown most clearly in Fig. 4 engaged by a pin or pins 37 on leaf 27. Also, the leaf is normally held spaced from the projections 26ª on the disc 26, thus to maintain the battery circuit open and the air-line valve closed due to deenergization of the solenoid, by a retractile spring as shown at 38. This spring is preferably set so as to prevent the governor from swinging the leaf over into contact with any projection 26ª on disc 26 during running of the truck 6 at normal racing speed, and even perhaps at the highest speeds ever found to be necessary to keep the lure the proper distance ahead of the dogs. However, the parts are so arranged that a sudden short spurt of speed of the truck over the highest of those speeds just mentioned, will cause the governor momentarily to overbear the tension of spring 38, and throw the wiper 27′ against the disc 26 to cause one or more openings and closings of the valve in the air supply line to the squealer 12.

It should be explained in this latter connection that the speed of travel of the truck is controlled by the amount of current allowed to flow through the third rail (not shown) feeding motor 8; this current feed being supervised by an electrician in a tower giving a clear lookout over the whole racing course. Thus, the squealing of the lure is entirely under the control of such an electrician.

Referring finally to Fig. 5, the same type of carrier as illustrated in Fig. 1 is shown, at 6. Here, however, not only the usual third rail for energizing the motor 8 is provided, as indicated in Fig. 5 at 39, but an additional third rail or equivalent 40. The truck of Fig. 5 is assumed to carry, in the present case, an installation like that already described in connection with Figs. 1 to 4, with the exception of the drive 22 and the mechanism actuated thereby. In lieu of these parts last referred to, the solenoid associated with the valve casing 14 of Fig. 1, indicated at 14ª in Fig. 5, is included in a low voltage circuit partly on the truck, as indicated at 41 and 42, and partly located at a suitable point alongside the track. This circuit is, as indicated, a grounded one, and includes a normally open switch 43. This switch is preferably located at a point convenient to the controlling electrician, say on a table in the top of his tower. It will be understood that whenever it is desired to have the lure emit a squeal or a series of squeals, the electrician has only to work the switch 43 in any manner desired. While the switch is open, the squealer 12 will be silent, and each time the switch is closed the squealer 12 will be actuated, and for as long as the switch is held closed.

Inasmuch as many changes could be made in the above constructions, and many apparently widely different embodiments of the invention could be made without departing from the scope thereof, it is intended that all matter contained in the above description or shown in the accompanying drawing shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

We claim:

1. In dog racing apparatus, the combination with a rail-track adapted to extend along-side a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality and including an operative connection extending along said support between the carrier and the instrumentality.

2. In dog racing apparatus, the combination with a rail-track adapted to extend along-side a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said actuating means including an operating means incorporating an electrical means having a circuit adapted to be made and broken to control sound emission from said instrumentality.

3. In dog racing apparatus, the combination with a rail-track adapted to extend alongside a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said actuating means including a pneumatic operating means operated by the movement of the carrier.

4. In dog racing apparatus, the combination with a rail-track adapted to extend alongside a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said actuating means including an electrical operating means operated by the movement of the carrier.

5. In dog racing apparatus, the combination with a rail-track adapted to extend alongside a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said actuating means including an operating means partially pneumatic and partially electrical, said operating means having both its pneumatic and electrical components operated by the movement of the carrier.

6. In dog racing apparatus, the combination with a rail-track adapted to extend alongside a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said means including an electrical means and also a centrifugally operated means rotated by movement of the carrier to have changes of speed corresponding to changes of speed of the carrier, such centrifugal means functioning to render said electrical means operative on an increase of speed of the carrier from a previous speed, said electrical means being normally inoperative.

7. In dog racing apparatus, the combination with a rail-track adapted to extend alongside a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said instrumentality being fluid-pressure operated, and said actuating means including a source of fluid under pressure, a conduit to convey such fluid to said instrumentality, a normally closed valve to said conduit, and means operative during the movement of the carrier to open said valve.

8. In dog racing apparatus, the combination with a rail-track adapted to extend alongside a running track for racing dogs and a wheeled carrier on such track, of a support on said carrier adapted to be maintained laterally offset from the carrier to support a lure simulating an animal to be chased by the dogs and to support said lure over the running track at a point considerably removed from the carrier, a sound emitting instrumentality on the support adjacent to the lure, and means on the carrier for actuating said instrumentality, said actuating means having associated therewith an electrical means to operate the actuating means to cause said instrumentality to emit sounds intermittently, said electrical means including a continuously operable electrical make and break device operated by the movement of the carrier.

AUGUSTUS M. HENRY.
ROBERT BURDETTE DALE.